(12) United States Patent
Kalhan (10) Patent No.: US 8,233,433 B2
(45) Date of Patent: *Jul. 31, 2012

(54) APPARATUS, SYSTEM AND METHOD FOR INITIATING WLAN SERVICE USING BEACON SIGNALS

(75) Inventor: Amit Kalhan, La Jolla, CA (US)

(73) Assignee: KYOCERA Corporation, Kyoto (JP)

(*) Notice: Subject to any disclaimer, the term of this patent is extended or adjusted under 35 U.S.C. 154(b) by 916 days.

This patent is subject to a terminal disclaimer.

(21) Appl. No.: 12/037,754

(22) Filed: Feb. 26, 2008

(65) Prior Publication Data

US 2009/0213819 A1  Aug. 27, 2009

(51) Int. Cl.
*H04W 4/00* (2009.01)
(52) U.S. Cl. ...... 370/328; 370/331; 455/436; 455/456.1
(58) Field of Classification Search .................. None
See application file for complete search history.

(56) References Cited

U.S. PATENT DOCUMENTS

| | | | |
|---|---|---|---|
| 4,737,978 A | 4/1988 | Burke et al. | |
| 5,208,756 A | 5/1993 | Song | |
| 5,293,645 A | 3/1994 | Sood | |
| 6,011,974 A * | 1/2000 | Cedervall et al. | 455/456.4 |
| 6,414,635 B1 * | 7/2002 | Stewart et al. | 342/457 |
| 6,434,367 B1 | 8/2002 | Kumar et al. | |
| 6,965,585 B2 | 11/2005 | Grill et al. | |
| 6,990,324 B2 | 1/2006 | Laroia et al. | |
| 7,050,819 B2 | 5/2006 | Schwengler et al. | |
| 7,167,712 B2 | 1/2007 | Ogino et al. | |
| 7,260,399 B1 * | 8/2007 | Oh et al. | 455/436 |
| 7,286,834 B2 | 10/2007 | Walter | |
| 7,433,673 B1 | 10/2008 | Everson et al. | |
| 7,610,049 B2 | 10/2009 | Watanabe | |
| 2003/0118015 A1 | 6/2003 | Gunnarsson et al. | |
| 2004/0051664 A1 | 3/2004 | Frank | |
| 2004/0090937 A1 | 5/2004 | Chaskar et al. | |
| 2004/0116133 A1 | 6/2004 | Kalhan et al. | |
| 2004/0198220 A1 | 10/2004 | Whelan et al. | |

(Continued)

FOREIGN PATENT DOCUMENTS

EP  0 504 122  9/1992

(Continued)

OTHER PUBLICATIONS

Han, et al. "A Method to Support Femto-Macro Handover with Minimal Interference to the Macro Network" IP.com Journal Oct. 16, 2008, pp. 1-4, West Henrietta, NY US.

(Continued)

*Primary Examiner* — Chi Pham
*Assistant Examiner* — Mohammad Adhami (57) ABSTRACT

An access point transmits a beacon signal when a multimode communication device is within a maximum proximity of the access point. A wireless wide area network (WWAN) receiver in the access point monitors a WWAN uplink channel used by the multimode wireless communication device to communicate with a WWAN base station. The access point determines, or at least estimates, a proximity of the multimode communication device to the access point based on a received WWAN uplink signal transmitted by the multimode wireless communication device. If the proximity is less than a proximity threshold, the access point transmits the beacon signal. The beacon signal at least indicates the presence of the access point and, in some circumstances, includes instructions or information to assist in a handoff from the WWAN to the WLAN.

27 Claims, 8 Drawing Sheets

U.S. PATENT DOCUMENTS

| | | |
|---|---|---|
| 2005/0059400 A1 | 3/2005 | Jagadeesan et al. |
| 2005/0090277 A1 | 4/2005 | Islam et al. |
| 2005/0135459 A1* | 6/2005 | Ginzburg et al. ............. 375/146 |
| 2005/0197132 A1 | 9/2005 | Lee et al. |
| 2005/0237963 A1 | 10/2005 | Storm |
| 2005/0282494 A1 | 12/2005 | Kossi et al. |
| 2006/0025138 A1* | 2/2006 | Kotzin .......................... 455/445 |
| 2006/0040656 A1 | 2/2006 | Kotzin |
| 2006/0056448 A1 | 3/2006 | Zaki et al. |
| 2006/0114885 A1 | 6/2006 | Baek et al. |
| 2006/0121916 A1 | 6/2006 | Aborn et al. |
| 2006/0264212 A1* | 11/2006 | Sekhar ...................... 455/432.1 |
| 2006/0268902 A1 | 11/2006 | Bonner |
| 2007/0002813 A1 | 1/2007 | Tenny et al. |
| 2007/0008925 A1* | 1/2007 | Dravida et al. ............... 370/331 |
| 2007/0010261 A1 | 1/2007 | Dravida et al. |
| 2007/0021127 A1 | 1/2007 | Zheng |
| 2007/0049276 A1 | 3/2007 | Rimoni et al. |
| 2007/0076662 A1* | 4/2007 | Jain et al. ..................... 370/331 |
| 2007/0104139 A1 | 5/2007 | Marinier et al. |
| 2007/0121560 A1 | 5/2007 | Edge |
| 2007/0140190 A1 | 6/2007 | Rensburg et al. |
| 2007/0149211 A1 | 6/2007 | Dunn et al. |
| 2007/0177530 A1 | 8/2007 | Ando et al. |
| 2007/0184845 A1 | 8/2007 | Troncoso |
| 2007/0201403 A1 | 8/2007 | Thome |
| 2007/0243882 A1 | 10/2007 | Edge |
| 2007/0254620 A1 | 11/2007 | Lindqvist et al. |
| 2008/0130555 A1 | 6/2008 | Kalhan |
| 2008/0130596 A1 | 6/2008 | Kalhan |
| 2008/0130597 A1 | 6/2008 | Kalhan |
| 2008/0130598 A1 | 6/2008 | Kalhan |
| 2008/0153497 A1 | 6/2008 | Kalhan |
| 2008/0261615 A1 | 10/2008 | Kalhan |
| 2008/0311927 A1 | 12/2008 | Boman et al. |
| 2009/0215400 A1 | 8/2009 | Chang et al. |

FOREIGN PATENT DOCUMENTS

| | | |
|---|---|---|
| EP | 1 816 888 | 8/2007 |
| EP | 1986341 | 10/2008 |
| JP | 07-154848 | 6/1995 |
| JP | 2002-353876 | 12/2002 |
| JP | 2005-110314 | 4/2005 |
| JP | 2005-269109 | 9/2005 |
| WO | WO 98/19474 | 5/1998 |
| WO | WO 02/054820 | 7/2002 |
| WO | WO 2004/002051 | 12/2003 |
| WO | WO 2004/054153 | 6/2004 |
| WO | WO 2004/057815 | 7/2004 |
| WO | WO 2004/084463 | 9/2004 |
| WO | WO 2005/076639 | 8/2005 |
| WO | WO 2007/064822 | 6/2007 |
| WO | WO 2008/066926 | 6/2008 |
| WO | WO 2008/066927 | 6/2008 |
| WO | WO 2008/066928 | 6/2008 |
| WO | WO 2008/066929 | 6/2008 |
| WO | WO 2008/091412 | 7/2008 |
| WO | WO 2009/067700 | 5/2009 |

OTHER PUBLICATIONS

Carstens, Juergen, "A Method for Interference Control and Power Saving for Home Access Point", IP.Com Journal, Dec. 13, 2007, pp. 1-3, West Henrietta, NY US.

Alejandro R. Holcman and Edward G. Tiedemann Jr., "CDMA Intersystem Operations", 1994 IEEE 44th Vehicular Technology Conference, Jun. 8, 1994, pp. 590-594, Stockholm, Sweden.

* cited by examiner

APPARATUS, SYSTEM AND METHOD FOR INITIATING WLAN SERVICE USING BEACON SIGNALS

RELATED APPLICATIONS

This application is related to U.S. patent application Ser. No. 12/037,768, entitled "PILOT SIGNAL TRANSMISSION management", and to U.S. Patent Application entitled "APPARATUS, SYSTEM AND METHOD FOR MANAGING WIRELESS SERVICE TO A WIRELESS COMMUNICATION DEVICE", Ser. No. 12/037,782, both filed concurrently with this application and incorporated by reference in there entirety, herein.

BACKGROUND

The invention relates in general to wireless communication systems and more specifically to managing wireless local area network (WLAN) services to multimode wireless communication devices.

Wireless local area networks (WLANs) and wireless wide area networks (WWANs) provide wireless communication services to portable communication devices where the WLANs typically provide services within geographical service areas that are smaller than the geographical areas serviced by WWANs. Examples of WWANs include systems that operate in accordance with 2.5 G (such as cdma2000), 3 G (such as UMTS, WiMax), and other types of technologies, where each base station of the WWAN is typically designed to cover a service area having a size measured in miles. The term WWAN is used primarily to distinguish this group of diverse technologies from WLANs that typically have smaller service areas on the order of 100 to 300 feet per base station. Base stations in WLANs are often referred to as access points. An access point may be connected to the Internet, intranet, or other network through wires or wirelessly through a WWAN. Examples of WLANs include systems using technologies such as Wi-Fi and other wireless protocols in accordance with IEEE 802.11 standards. WLANs typically provide higher bandwidth services than WWANs at the expense of non-ubiquitous coverage whereas WWANs provide increased coverage areas at the cost of bandwidth and/or capacity. In order to provide a wireless user with the increased overall performance and continuous connectivity, multimode mode wireless communication devices have been developed allowing the multimode wireless communication device to access the particular type of network that provides the most desirable tradeoffs. A multimode wireless communication device includes the appropriate components and functionality for communicating within more than one network. For example, a dual-mode wireless communication device can communicate within a WWAN and a WLAN.

Unfortunately, conventional techniques for managing the connection status between the multimode wireless communication device and the access point are limited in that they require GPS location information or include inefficient searching mechanisms executed by the multimode wireless communication device in order to establish service with a new network for performing a handoff between networks. For example, some conventional systems require the multimode wireless communication device to periodically tune to an alternate network channel in an attempt to detect an alternate network resulting in significant power consumption with a limited success rate of detecting alternate networks.

Accordingly, there is a need for an apparatus, system, and method for initiating handoffs of a multimode wireless communication device from a WWAN to a WLAN.

SUMMARY

An access point transmits a beacon signal when a multimode wireless communication device is within a maximum proximity of the access point. A wireless wide area network (WWAN) receiver in the access point monitors a WWAN uplink channel used by the multimode wireless communication device to communicate with a WWAN base station. The access point determines, or at least estimates, a proximity of the multimode wireless communication device to the access point based on a received WWAN uplink signal transmitted by the multimode wireless communication device. If the proximity is less than a proximity threshold, the access point transmits the beacon signal. The beacon signal at least indicates the presence of the access point and, in some circumstances, includes instructions or information to assist in a handoff from the WWAN to the WLAN.

DETAILED DESCRIPTION

Figure 1:
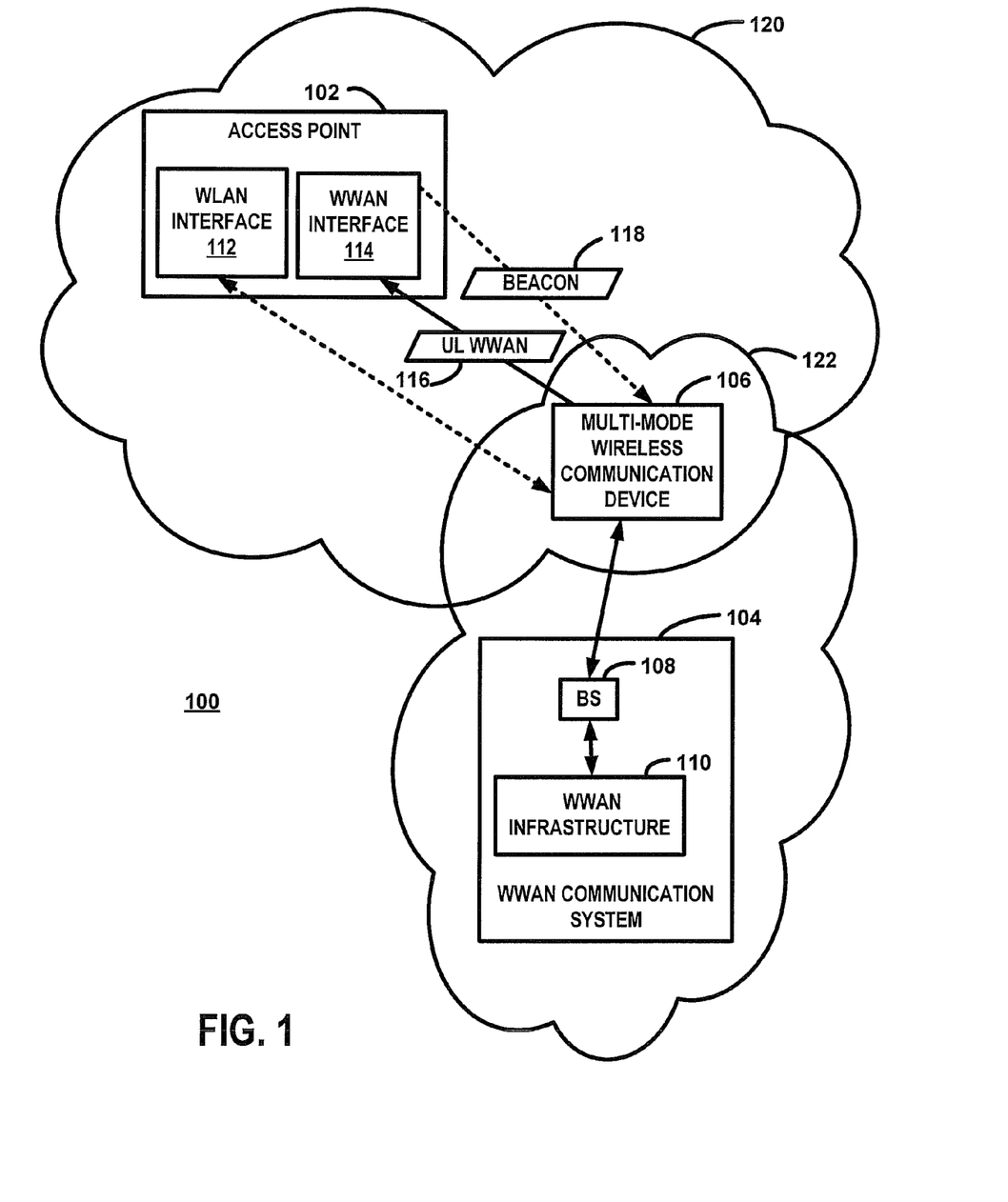
FIG. 1 is a block diagram of a communication network arrangement in accordance with the exemplary embodiment of the invention.

FIG. 1 is a block diagram of a communication network arrangement 100 in accordance with the exemplary embodiment of the invention. The access point 102 provides wireless local area network (WLAN) service to one or more multimode wireless communication devices 106 within a first geographic area and a base station 108 of a Wireless Wide Area Network (WWAN) communication system 104 provides WWAN service to one or more multimode wireless communication devices 106 within a second geographical area. As described above, the term WWAN is used primarily to distinguish this group of diverse technologies from WLANs that typically have smaller service areas on the order of 100 to 300 feet per base station. Accordingly, the WWAN communication system 104 is any system that provides wireless communication services within relatively large geographical areas as compared to WLANs. Examples of WWAN systems 104 include cellular communication systems that provide cellular communication services through at least one base station 108 connected to a WWAN infrastructure 110 such as a cellular system infrastructure (110). The WWAN infrastructure 110 may include one or more core networks that are connected to a global network such as Internet Protocol (IP) network or public switched telephone network (PSTN). In the exemplary embodiment, the WWAN communication system 104 operates using packet switching communication techniques. In such systems, the communication infrastructure is a packet switched core network and includes an access gateway for interfacing to WLANs using IP signaling. The WWAN communication system 104, however, may operate in accordance with circuit switched communications in some circumstances. The WWAN communication system 104 may operate using any of numerous protocols and schemes. Examples of some Code Division Multiple Access (CDMA) standards include cdma2000 1X, 1xEV-DO, and W-CDMA. In some circumstances, the WWAN communication system 104 may operate with other standards such as OFDM based standards or GSM standards, for example. In the embodiment discussed below, the WWAN communication system 104 is an OFDM system that operates in accordance with IEEE 802.16(e) standards often referred to as WiMax. The various functions and operations of the blocks described with reference to the WWAN communication system 104 may be implemented in any number of devices, circuits, or elements. Two or more of the functional blocks may be integrated in a single device and the functions described as performed in any single device may be implemented over several devices. For example, at least portions of the functions of the WWAN infrastructure 110 may be performed by the base station 108, a base station controller, or the MSC in some circumstances.

The access point 102 includes a WLAN interface 112 for communicating with multimode wireless communication device 106 and a WWAN interface 114 for receiving a UL WWAN signal 116 and transmitting a beacon signal 118. As discussed below, the WWAN interface 114 also intercepts down link (DL) WWAN signals transmitted by the base station 108 in the exemplary embodiment. The WWAN interface 114, therefore, includes any combination of hardware, software and/or firmware adequate to at least detect WWAN UL signals and to transmit the beacon signal 118 to the multimode wireless communications device 106 and the WLAN interface 112 includes any combination of hardware, software and/or firmware adequate to at provide wireless WLAN service to one or more WLAN devices.

The multimode wireless communication device 106 is any type of communication device that is capable of communicating with at least one WLAN network 120 and at least one WWAN system 104. The multimode wireless communication device 106, sometimes referred to as an access terminal, may be a wireless modem, a personal digital assistant, dual mode cellular telephone, or other such device.

The access point 102 facilitates communication to a WLAN 120 and the WWAN communication system 104 facilitates communication to a WWAN 122, where the multimode wireless communication device 106 is capable of communicating on both of the networks WLAN 120, WWAN 122. The multimode wireless communication device 106 can access wireless services provided by either of the networks WLAN 120, WWAN 122 when resources are available on the particular network and signal quality is adequate. In the exemplary embodiment, the multimode wireless communication device 106 may access both networks 120, 122 simultaneously under certain conditions. In some circumstances, however, the multimode wireless communication device 106 may be able only to access one of the networks WLAN 120, WWAN 122 at any given time. In another scenarios, the multimode wireless communication device 106 may be able to access only control channels of the WWAN network 122 but have full access of WLAN network 120 or vice versa. The clouds shown in FIG. 1 symbolize networks and do not necessarily illustrate service coverage areas of the networks WLAN 120, WWAN 122. For example, as discussed with reference to FIG. 2A, FIG. 2B and FIG. 2C below, the geographical service coverage area of the WWAN 122 may include, or partially overlap, one or more WLAN 120 service coverage areas provided by one or more access points 102. Further, the service coverage area of the WWAN 122 may have areas with poor quality service coverage or areas where no WWAN 122 service is available. These areas, however, may have good service coverage from a WLAN 120. Such a scenario may occur where the WLAN service coverage is within a building such as an office or home and the WWAN service coverage is generally available in the area of the building but lacking within the building due to walls and other signal obstructions. In addition to other advantages, managing wireless services in accordance with the exemplary embodiments maximizes the quality of the wireless services provided to the multimode wireless communication devices 106 while minimizing interference with and between networks.

Based on one or more characteristics of the UL WWAN signal 116, the access point 102 determines the proximity of the multimode wireless communication device 106 to the access point 102. If the proximity is less than a proximity threshold, the access point 102 transmits the beacon signal 118. The multimode wireless communication device 106 receives the beacon signal 118 and, depending on one or more factors, may initiate a handoff process from the WWAN 122 to the WLAN 120 where the process may include forwarding information to the WWAN 122 based on the beacon signal 118. In the exemplary embodiment, the multimode wireless communication device activates a WLAN receiver within the wireless communication device 106 and attempts to detect WLAN signals transmitted by the access point 102. By only transmitting the beacon signal 118 when the presence of a multimode wireless communication device is detected, interference due to the beacon signal 118 is minimized and/or collisions are avoided with other beacon signals transmitted by other AP in the same region. Accordingly, the beacon signal 118 is illustrated in FIG. 1 with a dashed line to indicate that the beacon signal 118 is not continuously transmitted. Since the beacon signal 118 is transmitted within the WWAN frequency band, the multimode wireless communication device 106 does not need to activate WLAN circuitry to search for WLAN systems until the beacon signal 118 is detected. Accordingly, power consumption in the multi-mode wireless communication device 106 is minimized.

Figures 2A, 2B:
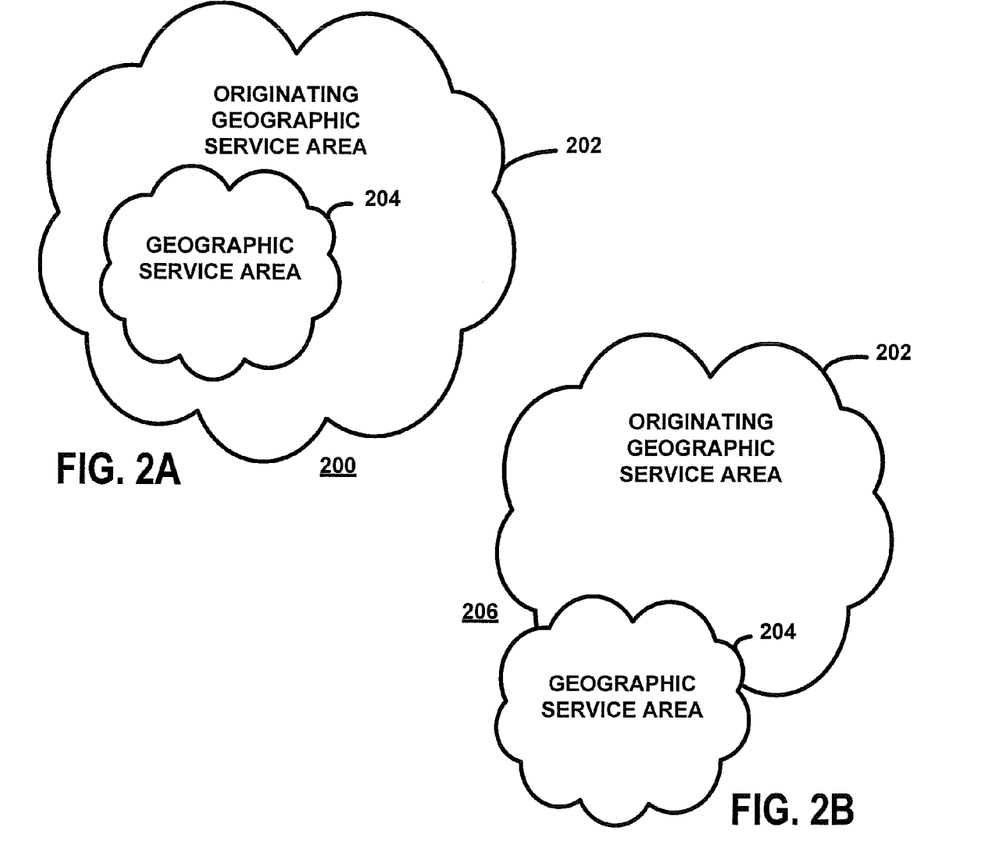
FIG. 2A is an illustration of an originating geographic area encompassing a geographic service area.
FIG. 2B is an illustration of an originating geographic area overlapping with a geographic service area.
Figure 2C:
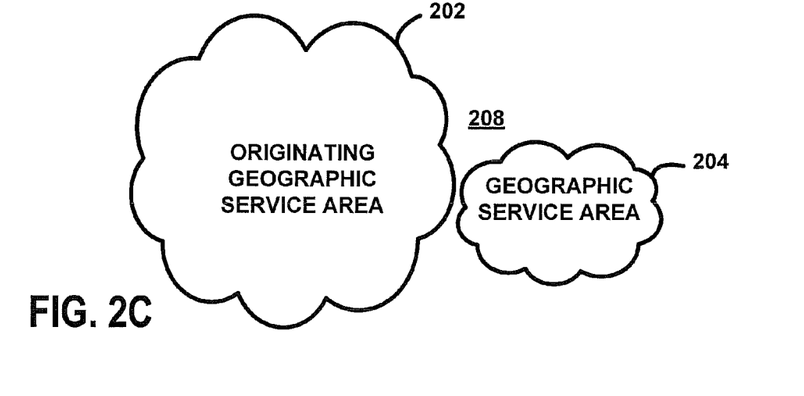
FIG. 2C is an illustration of an originating geographic area adjacent to a geographic service area.

FIG. 2A, FIG. 2B and FIG. 2C are depictions of exemplary geographical service area relationships 200, 206, 208 provided by the base station 108 and the access point 102. An originating geographical service area 202 provided by the base station 108 and a WLAN geographic service area 204 provided by the access point 102 may have any of numerous shapes, sizes, and configurations. Accordingly, the clouds representing the service areas generally illustrate the relationships between the service areas and do not necessarily depict the actual shapes of the service areas. Further, the service areas may contain holes of coverage where service is unavailable. In the interest of clarity and brevity, such features are not illustrated in the figures. In FIG. 2A, the service area 204 of the access point is completely within the service area 202 provided by the base station 108. In most situations, the service area 204 of the access point 102 will be completely within the service area 202 of the base station 108. In some situations, however the service area 204 may be partially overlapping with the service area 202 as shown in FIG. 2B or may be non-overlapping but adjacent to the service area 202 as shown in FIG. 2C.

Figure 3:
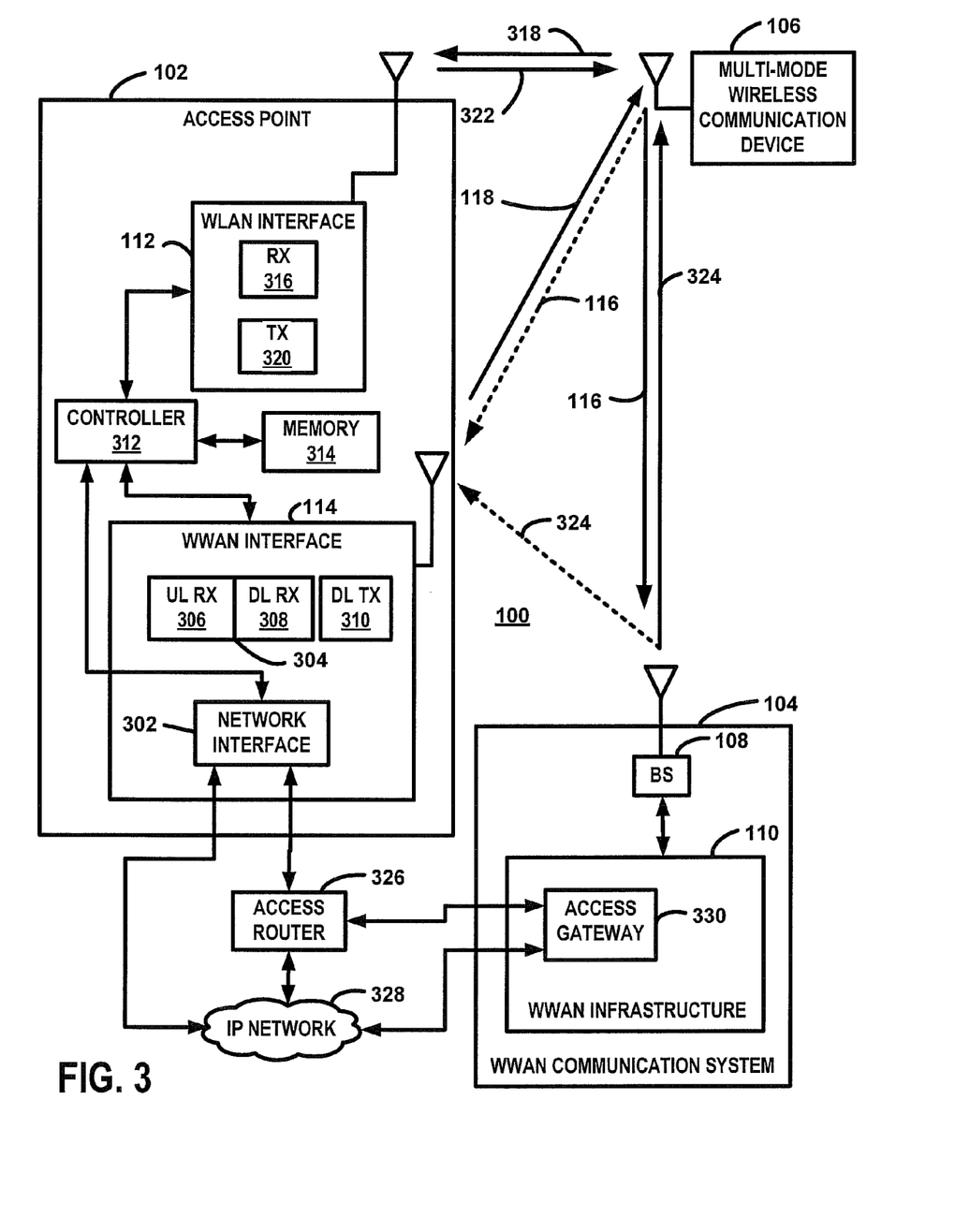
FIG. 3 is a block diagram of the access point connected to the WWAN communication system in accordance with the exemplary embodiment.

FIG. 3 is a block diagram of the access point 102 connected to the WWAN communication system 104 in accordance with the exemplary embodiment. The access point 102 includes the WWAN interface 114 for communicating with the WWAN system 104, receiving the UL WWAN signal 116 and for transmitting the beacon signal 118. In the exemplary embodiment, the WWAN interface 114 includes a network interface 302, a WWAN receiver 304 that includes a WWAN uplink receiver (WWAN UL receiver) 306 and a WWAN downlink receiver (WWAN DL receiver) 308 as well as a WWAN downlink transmitter (WWAN DL TX) 310. The WLAN interface 112 provides WLAN service to one or more WLAN communication devices such as the multimode wireless communication device 106. The access point 102 further comprises a controller 312 coupled to the WWAN interface 114 and the WLAN interface 112. The controller 312 performs the control functions described herein as well as performing other functions and facilitating the overall operation of the access point 102. The controller 312 is connected to, or includes, a memory 314 that may include one or more random access memory (RAM) and/or read only memory (ROM) memory devices. The WLAN interface 112 includes a WLAN receiver 316 for receiving uplink (UL) WLAN signals 318 and a WLAN transmitter 320 for transmitting WLAN downlink signals 322. The signals 318, 322 are transmitted and received in accordance with a WLAN protocol. Examples of a suitable WLAN protocols include protocols in accordance with the IEEE 802.11 protocol and wireless fidelity (WiFi). In some circumstances, the access point 102 may also include a wired LAN interface (not shown) for communicating with devices connected to the access point 102 through wires.

As explained above, the WWAN interface 114 includes a WWAN receiver 304 that can be configured to at least to receive uplink WWAN signals 116 transmitted from a multimode wireless communication device 106. The WWAN interface 114 is also configured to send the beacon signal 118 to the multimode wireless communication device 106 on a WWAN downlink channel in the WWAN downlink frequency band. In the exemplary embodiment, the WWAN receiver 304 can be configured as the uplink WWAN receiver 306 for receiving the uplink WWAN signals 116 and as the downlink WWAN receiver 308 for receiving WWAN downlink signals 324 from a base station 108. In some circumstances, two separate WWAN receivers may be used to implement the functions of the WWAN uplink and downlink receivers 306, 308 while in other situations, the same receiver may be tuned to different frequencies to perform the functions of the two receivers (306, 308). Also, in some implementations, the capability to receive WWAN downlink signals 324 may be omitted.

The network interface 302 exchanges messages with an access router 326 and an Internet protocol (IP) network 328. The network interface 302 provides packet data communications and facilitates access to the Internet and to an access gateway 330 in the WWAN infrastructure 110 through the access router 226. In some circumstances, at least portions of the network interface 302 may be implemented separately from the WWAN interface 114. The access router 326 may be connected to several access points 102 and provides communication management and control functions to the WLAN. In some situations, the access router 326 may be implemented within an access point 102 or may be eliminated. Also, in some circumstances, the connection between the access gateway 330 and the access point 102 may include a wireless communication link such as satellite communication link or point-to-point microwave link, for example.

In addition to other information, the memory 314 stores communication device identification values corresponding to each multimode wireless communication device 106 that is authorized to use the access point 102. The multimode wireless communication device 106 identification value may include an electronic serial number (ESN) or other unique data. An example of a group of identification values stored in memory includes a collection of ESNs corresponding to the multimode wireless communication devices 106 of the family members of a household where the access point 102 provides WLAN service. The identification values may be stored at the access point 102 using any of numerous techniques. An example of a suitable method of storing the values includes storing the values during an initialization procedure performed when the access point 102 is installed. In some implementations, the identification values may be omitted or the access point 102 may allow multimode wireless communication devices 106 that do not have corresponding identification values stored at the access point 102 to receive WLAN service from the access point 102.

The access point 102 monitors the uplink WWAN channel (s) that may contain an uplink WWAN signal 116 transmitted from a multimode wireless communication device 106 that is not currently receiving WLAN service from the access point 102. The uplink WWAN receiver 304 is tuned, or otherwise configured, to receive the uplink WWAN signals 116. Based on one or more received WWAN UL signals 116, the controller 312 determines the proximity of the multimode wireless communication device 106 to the access point 102. An example of suitable technique for determining the proximity includes evaluating a power level of the received UL WWAN signal. In some circumstances, the detection of a UL WWAN signal from the multimode wireless communication device 106 may be sufficient to determine that the multimode wireless communication device 106 is within a proximity range. In the exemplary embodiment, the proximity is used to determine whether the multimode wireless communication device 106 is possibly within range of the access point 102 and possibly able to receive WLAN service. Therefore, the controller 312 at least determines whether the communication device is possibly within WLAN range of the access point 102. The controller 312 may determine whether to transmit the beacon signal 118 based on factors other than power level of the signal. For example, factors may include only the power level of the WWAN UL signal or on a factor based solely on the WWAN UL receiver's 304 ability to decode the incoming UL signal. The beacon signal 118 transmission may result in an attempt by the multimode wireless communication device 106 to acquire wireless service from the access point 102 in the exemplary embodiment. The determination to transmit the beacon signal 118, therefore, may be based on other criteria in addition to the proximity. For example, the decision to transmit the beacon signal 118 may be based on access point capacity, available bandwidth, and/or current bandwidth requirements of the multimode wireless communication device 106. Therefore, any of numerous criteria may be used to determine if WLAN service should be acquired by the multimode wireless communication device 106 where the criteria may include conditions related to the capacity of the access point 102 and/or the requirements of the multimode wireless communication device 106.

Any of several techniques may be used to determine the proximity of the multimode wireless communication device 106 based on the WWAN UL signal. In the exemplary embodiment discussed below in further detail, a downlink WWAN signal transmitted from the base station 108 to the multimode wireless communication device 106 is intercepted by the access point 102 and decoded to determine uplink scheduling information. Based on the difference in received power and transmitted power of the WWAN UL signal, the access point 102 determines the distance. The access point 102 may also determine distance based on the difference between the arrival time and transmission time of the WWAN UL signal. In another example, the access point 102 may determine that the multimode wireless communication device 106 sufficiently close to generate the beacon signal 118 if the received power level is above a threshold without information regarding the transmission power level. Another example of a suitable technique of determining proximity includes utilizing multiple antennas or smart antennas to determine the proximity of the multimode wireless communication device 106 to the access point 102 based on the uplink WWAN signal transmitted by the communication device 106. For example, beam-forming antennas may provide distance information to allow the controller to determine whether the multimode wireless communication device 106 is within the WLAN service area. Other techniques or combinations or techniques may be used. For example, in some circumstances, a multimode device may transmit a geographic location of the multimode communication device with respect to the WWAN BS using GPS/AFLT methods. The access point may intercept the transmission to the WWAN base station and retrieve the GPS information which is used to determine the proximity of the multimode wireless communication device. In other circumstances, the GPS information may be forwarded from the WWAN base station to the access point at the request of the access point.

In the exemplary embodiment, the WWAN infrastructure 110 comprises a packet switched core network that includes at least one access gateway 330. The access router 326 may be connected to the access gateway 330 using any combination of wired and wireless connections. Examples of suitable connections include T1 lines, fiber optic cable, coaxial cable, and point-to-point microwave. The access gateway 330 is a communication interface that allows the access point 102 to communicate with the WWAN infrastructure.

During operation, information regarding the power level is determined by intercepting the WWAN DL signals 324 that contain uplink scheduling information corresponding to each multimode wireless communication device 106. In the exemplary embodiment, information is extracted from the UL MAP transmitted in the WWAN DL signal. The controller 312 maintains a frequency and timing information for uplink transmission for each multimode wireless communication device 106 associated with each stored identification value. Also, signal timing information extracted from the downlink WWAN signal may be used to calculate a WWAN UL signal propagation time of the WWAN UL signal and, therefore, the proximity of the multimode wireless communication device 106. In the exemplary embodiment where the WWAN system is an OFDMA system, multimode wireless communication device 106 transmission power level is the same for each multimode wireless communication device 106 unless adjusted by the OFDMA system. During system initialization of the access points, the default power level is stored in memory 314. Any adjustments to the transmission power level for a particular multimode wireless communication device 106 are forwarded to the access point 102 and updated in memory 314. In some circumstances, transmission power level updates may not be available and the access point 102 uses the default values for proximity calculations. The access point 102 determines the proximity or a proximity estimate based on the measured propagation loss of the transmitted uplink signal and propagation time. In some situations, a combination of propagation time, propagation loss, and other parameters may be used to determine the proximity.

After determining the proximity of the multimode wireless communication device 106 to the access point 102, the controller 312 determines whether the access point 102 should provide WLAN service to multimode wireless communication device 106. If the controller 312 determines that the access point 102 should provide WLAN service to the multimode wireless communication device 106, the controller 312 generates a beacon signal 118 which is transmitted by the WWAN DL transmitter 310 configured in accordance with the WWAN communication system 104 technology. For example, if the WWAN technology is OFDM, the beacon signal 118 modulates an OFDM tone (sub-carrier) on the WWAN downlink with a conventional modulation scheme such as for example, quadrature amplitude modulation (QAM), quaternary phase shift keying QPSK or another similar scheme, at a low symbol rate maintaining data rates similar to conventional single-carrier modulation schemes.

In the exemplary embodiment, the access point 102 autonomously determines that the beacon signal 118 should be transmitted to allow the multimode wireless communication device 106 the ability to detect the access point 102. In some circumstances, the analysis and determination to transmit the beacon signal 118 may be at least partially performed by a network entity such as a WLAN network controller or a WWAN controller. For example, after detecting the presence of a multimode wireless communication device 106, the access point 102 may report the identity of the detected multimode wireless communication device 106 to the WWAN infrastructure 110. If the WWAN infrastructure 110 determines that a handoff should not be performed, instructions are transmitted to the access point 102 indicating that the beacon signal 118 should not be transmitted. In other situations, the beacon signal 118 is transmitted and the decision to perform a handoff if performed by the network after the multimode wireless communication device 106 detects the beacon signal 118. Further, in some situations, the multimode wireless communication device reports only the signal-quality of the beacon. Also, the beacon signal may not target the multimode device. For example, the beacon may only include generic information not specific to the multimode wireless communication device such as WLAN identifier. After the beacon signal is transmitted by the access point and detected by the multimode wireless communication device 106, the multimode wireless communication device 106 activates a WLAN receiver to search for the access point 102. To detect the beacon signal 118, the multimode wireless communication device 106 appropriately demodulates and decodes the beacon signal 118. In response to receive the beacon signal 118, the multimode wireless communication device 106 activates and tunes a WLAN interface 112 to search for a WLAN signal in accordance with known techniques. In some situations, the multimode wireless communication device 106 may report the detection of the beacon signal 118 and/or the detection of the WLAN network 120. In response the WWAN infrastructure (core network) 110 sends an instruction to the multimode wireless communication device 106 indicating that the multimode wireless communication device 106 should search for the specific access point 102 that sent the beacon 118. In other situations, the WWAN infrastructure (core network) 110 may instruct the multimode wireless communication device 106 to acquire WLAN service. Therefore, the decision to perform the handoff may at least partially be performed by the WWAN or WLAN in some situations.

In some circumstances, therefore, information may be sent to the WWAN infrastructure 110 that notifies the WWAN 122 that WLAN service may be available to the multimode wireless communication device 106. This information includes at least information identifying the multimode wireless communication device 106 that results in an interpretation by the WWAN infrastructure 110 that WLAN service may be available to the multimode wireless communication device 106. The information, however, may include additional data such as, for example, information identifying the access point 102, the calculated or estimated proximity of the multimode wireless communication device 106 to the access point 102, and available capacity on the access point 102. Access point 102 identification information may include a SSID of the access point 102. Further, information conveyed to the WWAN 122 may contain security protocol that assists the core network 110 in identifying the access point 102. The WWAN infrastructure 110 may perform additional analysis to determine what instructions, if any, will be sent to the multimode wireless communication device 106. In some situations, the WWAN infrastructure (core network) 110 sends an instruction to the access point 102 indicating that the access point 102 should transmit the beacon signal 118.

Figure 4:
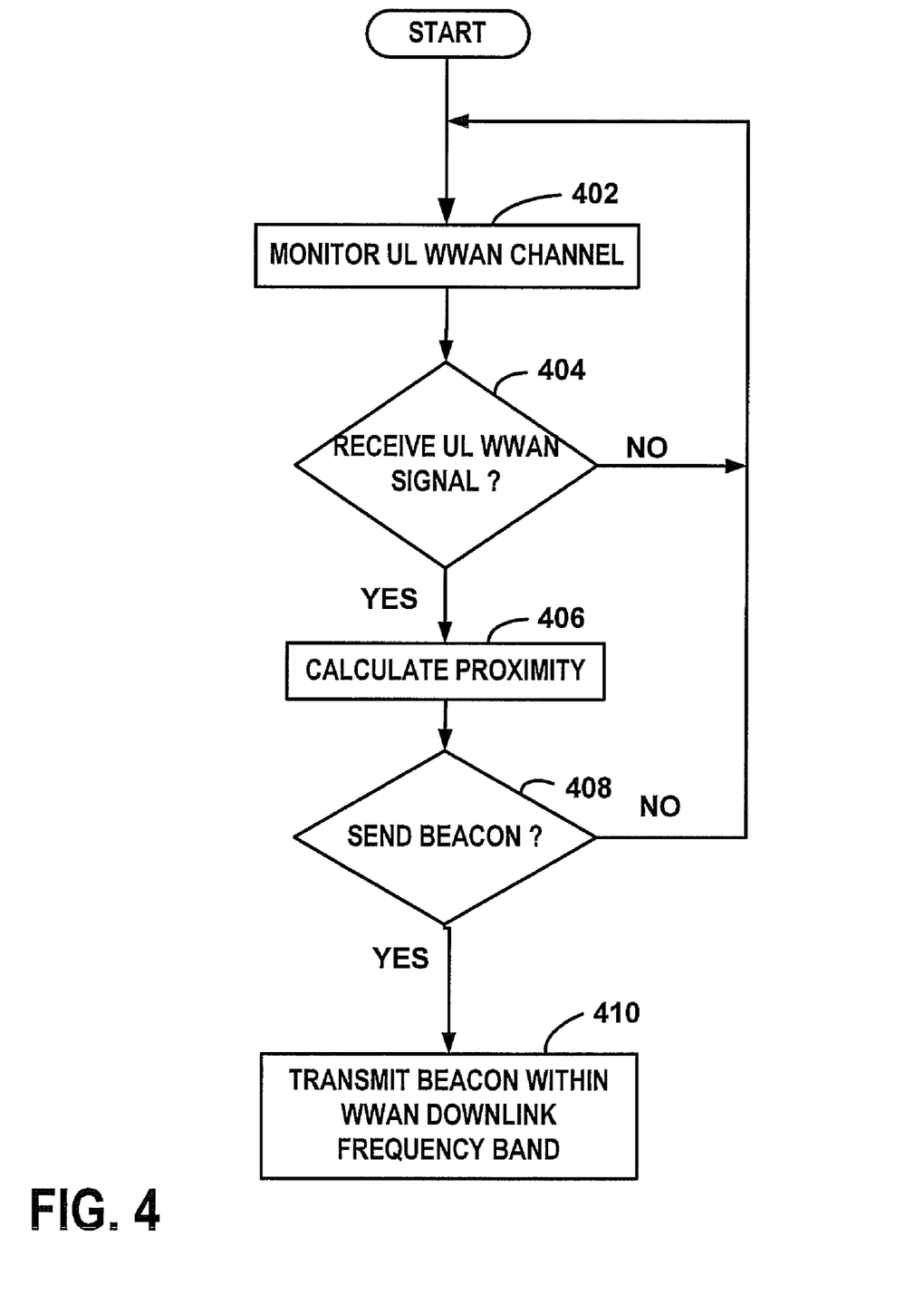
FIG. 4 is a flow chart of a method of managing wireless service to a multimode wireless communication device in accordance with the exemplary embodiment.

FIG. 4 is flow chart of a method of managing wireless service to a multimode wireless communication device 106 in accordance with the exemplary embodiment. The method may be performed by any combination of hardware, software and/or firmware. The order of the steps discussed below may be varied and one or more steps may be performed simultaneously in some circumstances. In the exemplary embodiment, the method is performed, at least in part, by executing code on the controller 312 in the access point 102.

At step 402, the WWAN uplink (UL) channel is monitored. In the exemplary embodiment, the WWAN UL receiver 306 is tuned to decode any WWAN UL signals 116 transmitted from any of the multimode wireless communication devices 106 in the user list. The uplink scheduling information enables more efficient UL monitoring. The access point 102 may detect multimode wireless communication devices 106 that are not in the user list but will not be able to decode the signals without identification information in the exemplary embodiment. In some circumstances, however, the WWAN UL receiver 306 may be configured to monitor all UL channels.

At step 404, it is determined whether the WWAN UL receiver 306 has received a WWAN UL signal 116. In the exemplary embodiment, the controller 312 determines whether a WWAN UL signal 116 has been received from a multimode wireless communication device listed in the user list. If a WWAN UL signal 116 has been received, the method continues at step 406. Otherwise, the method returns to step 402 to continue monitoring the WWAN UL channels.

At step 406, the proximity of the communication device 106 to the access point 102 is calculated. The proximity calculation may be based on any number of parameters or characteristics of the received WWAN UL signal 116 as well as other factors. Examples of suitable parameters include parameters related to signal power level and a timing offset between a transmission and reception times. Other related factors may include transmission power level, location of one or more WWAN base stations 108 and information extracted from WWAN UL signals 116 and WWAN DL signals 324 such as time stamps, power level indicators, and power control indicators. In some circumstances, the proximity is based only on a detection of the WWAN UL signal 116. The particular factors and calculation techniques depend on the type of WWAN communication system 104. An exemplary technique suitable for an OFDM based system IEEE 802.16(e) is discussed with reference to FIG. 5 below.

At step 408, it is determined whether a beacon signal 118 should be transmitted. Although the determination may be based solely on the proximity of the multimode wireless communication device 106 to the access point 102, other factors may be considered in some circumstances. For example, the determination may be based on whether the multimode wireless communication device 106 should acquire WLAN service. Examples of other factors include the capacity of the access point 102, the required bandwidth required by the multimode wireless communication device 106, the current cost of the WWAN service and the estimated motion of the multimode wireless communication device 106. If the controller 312 determines that WLAN service should be acquired, the method continues at step 410, otherwise, the method returns to step 402. In some circumstances, this step may be omitted and the access point 102 may send information regarding the detection of the multimode wireless communication device 106 to the WWAN 122 with other information to allow the WWAN system 104 to make the determination of whether a multimode wireless communication device 106 should acquire WLAN service from the access point 102.

At step 410, a beacon signal 118 is sent to the multimode wireless communication device 106 on the WWAN down link channel within the downlink frequency band.

Figure 5:
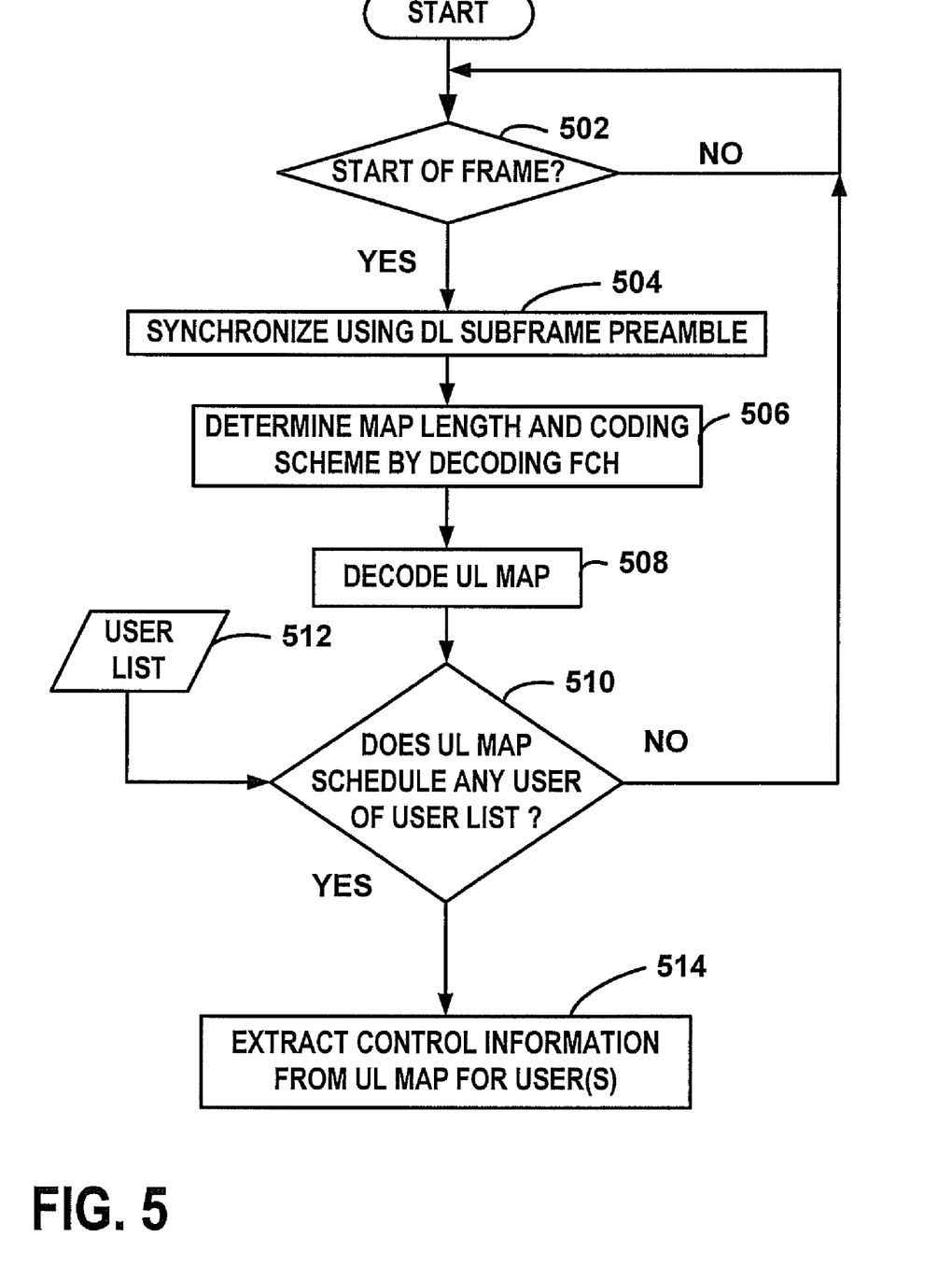
FIG. 5 is a flow chart of a method of monitoring a WWAN DL channel at a wireless access point where the WWAN system operates in accordance with in accordance with the IEEE 802.16 standard.

FIG. 5 is a flow chart of a method of monitoring a WWAN DL channel at an access point 102 where the WWAN system 104 operates in accordance with OFDM techniques. The exemplary method operates within an OFDMA system that functions in accordance with IEEE 802.16(e) protocols. The method described with reference to FIG. 5 is an example of suitable technique for acquiring information that allows the access point 102 to monitor the uplink WWAN channels. As discussed with reference to FIG. 5 and FIG. 6, the downlink (DL) WWAN signal and WWAN DL channel are referred to as downlink (DL) signals and downlink (DL) channels and correspond to communications from an OFDMA base station 108, sometimes referred to as an access node (AN), to the multimode wireless communication device 106. As discussed with reference to FIG. 5 and FIG. 6, uplink (UL) WWAN signals and WWAN UL channels are referred to as uplink (UL) signals and uplink (UL) channels and correspond to communications from the multimode wireless communication device 106 to the OFDMA base station 108. As is known, IEEE 802.16(e) standards (WiMax) can operate in a time division duplex (TDD) or frequency division duplex (FDD) scheme. In the exemplary embodiment, the system operates in TDD mode. Those skilled in the art will readily apply the teachings herein to implement the system in FDD mode. In a TDD mode, each frame is split into a downlink (DL) sub-frame and an uplink (UL) sub-frame. The DL sub-frame includes a preamble, control information and other broadcast messages and packets. The control information includes DL and UL MAPs. Each multimode wireless communication device 106 is assigned a specific set of frequencies for receiving respective data packets. Each communication device 106 is also assigned a set of frequencies for transmitting in the UL.

At step 502, the controller 312 locates the start of a DL frame. When the start of the frame is found, the method continues at step 404. Otherwise, the step 402 is repeated.

At step 504, the WWAN DL receiver 308 acquires and synchronizes to the incoming signal 324 using the DL subframe preamble. The WWAN DL receiver 308, therefore, performs the functions of a DL receiver in the exemplary method.

At step 506, the Frame Control Header (FCH) is decoded to determine the DL data burst length and coding scheme. In the exemplary method, the FCH burst is followed by the preamble. In networks operating in accordance with IEEE 802.16(e) standards, an uplink map (UL MAP) is a Medium Access Control (MAC) message that defines burst start times and frequencies on the UL channels for each multimode wireless communication device 106.

At step 508, the UL MAP is decoded. Accordingly, the received DL signals 324 provides information in the UL MAP that allows the controller 312 to determine the timing of UL signals 116 and carrier frequencies assigned to the multimode wireless communication device 106. In addition, the UL MAP includes user identification (ID) information corresponding to multimode wireless communication devices 106 that are receiving the DL signals 324 from the base station (access node) 108.

At step 510, it is determined whether one or more of the multimode wireless communication devices 106 listed in a user list 512 at the access point 102 are contained in the UL MAP. The user list 512 includes identification information that uniquely identifies multimode wireless communication devices 106 that are supported by the access point 102. For example, the IEEE 802.16(e) standard uses manufacturer-issued X.509 digital certificates to identify devices. The user list 512 is typically programmed at the time of installation of the access point 102 and may be modified to add or remove user IDs. The users may be members of a household that reside where the access point 102 is installed. If no user IDs in the user list are contained in the UL MAP, the method returns to step 502. Otherwise, the method continues at step 514. In some circumstances, the UL MAP may not contain an explicit identification number and may include indirect identification information that can be used to determine the identity of the multimode wireless communication device 106.

At step 514, the control information for all of identified users is extracted from the UL MAP or other control messages. The control information is the transmission UL control information that includes a UL transmission power level and a UL transmission time for the WWAN UL signals 116 transmitted by the multimode wireless communication devices 106. The timing information corresponding to the identified multimode wireless communication device 106 is extracted from the decoded UL MAP and stored in memory 314.

Figure 6:
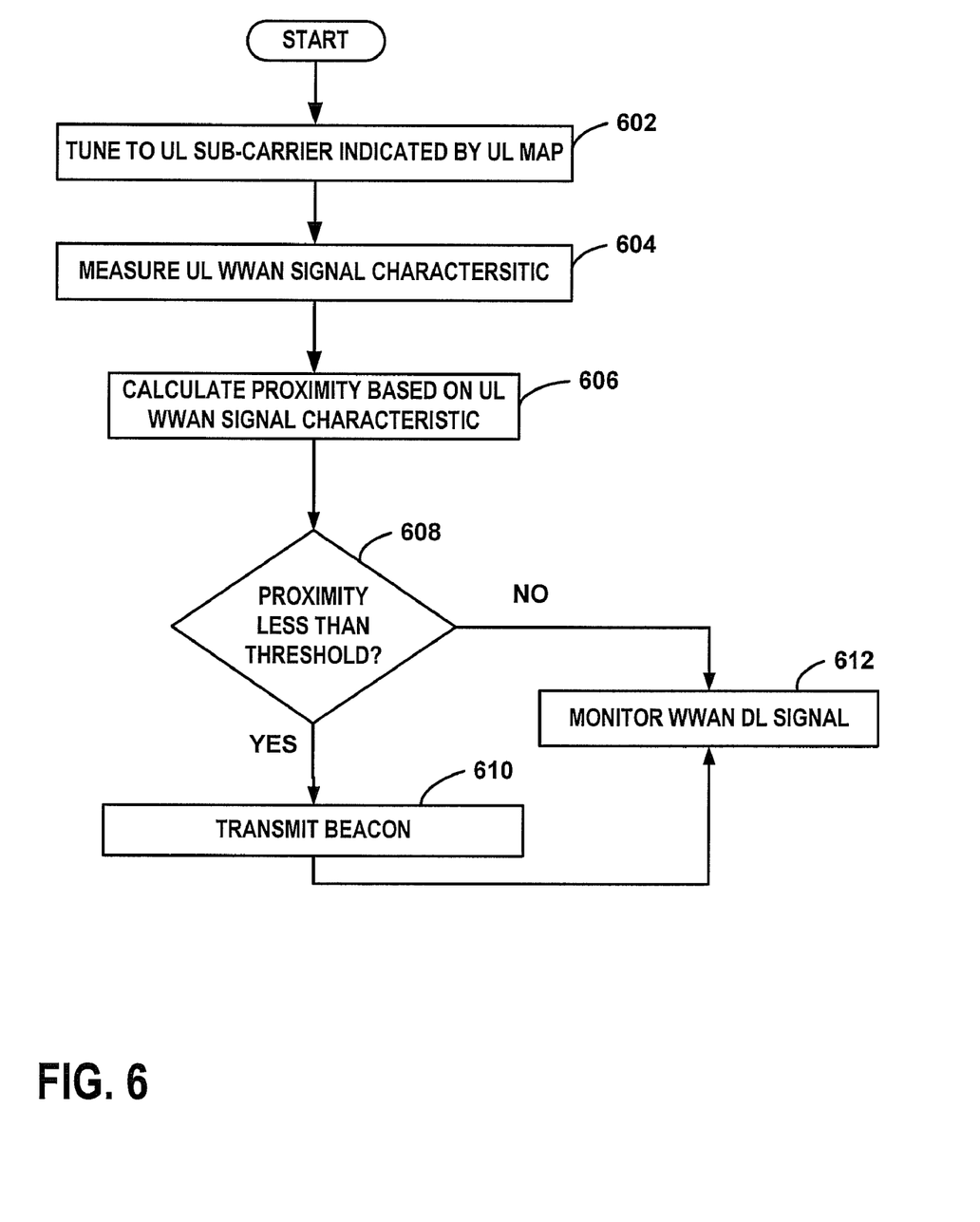
FIG. 6 is a flow chart of an exemplary method of managing wireless resources where the WWAN system operates in accordance with the IEEE 802.16 standard.

FIG. 6 is a flow chart of an exemplary method of managing wireless resources where the WWAN system 104 operates in accordance with OFDMA based system such as IEEE 802.16 (e) The exemplary method is performed by the access point 102 and includes monitoring a WWAN UL channel and initiating an acquisition of WLAN service to the multimode wireless communication device 106 based on a received WWAN UL signal 116. Using the information determined with the method discussed with reference to FIG. 4, the access point 102 monitors the UL WWAN channel and sends a WLAN acquisition message if certain criteria met.

At step 602, the WWAN receiver 304 is tuned to the UL sub-carrier frequency indicated by the UL map. The UL sub-carrier frequency intercepted by the access point 102 is used to tune the WWAN UL receiver 306. In some situations, a single receiver may be tuned to both uplink and downlink frequencies. In the exemplary embodiment, the receiver 304 can simultaneously receive UL and DL signals 116, 324.

At step 604, the characteristics of the received UL WWAN signal is measured. In the exemplary embodiment, the controller 312 determines the power level and the reception time of the received UL signal 116. In some situations only the reception time or the power level is determined. Using known techniques, the power of the received UL WWAN signal 116 is measured and stored in memory 314. The reception time is determined relative to the system time and stored in memory 314. Other signal characteristics may be determined in some circumstances where the signal characteristics provide information regarding the proximity of the multimode wireless communication device 106 to the access point 102. In the exemplary embodiment, the identification information is used to identify the multimode wireless communication device 106 only and not to decode the signals in order to minimize cost. In some implementations, however, the identification information may be used to decode the WWAN UL signals 116.

At step 606, the controller 312 calculates the proximity of the multimode wireless communication device 106 transmitting the UL signal 116 to the access point 102. Based on the characteristics of the UL signal 116, the controller 204 determines the distance from the access point 102 to the multimode wireless communication device 106. Using the transmission time of the WWAN UL signal determined from the UL MAP and reception time, the controller 204 calculates a propagation time of the UL signal 116. The propagation attenuation of the UL signals 116 is determined by calculation the difference between the transmission power and the reception power. Using either or both of the propagation parameters, the controller 204 calculates the proximity of the multimode wireless communication device 106 to the access point 102. For example, the distance may be determined by multiplying the propagation time by the speed of light. The distance may also be calculated by comparing the propagation loss to a known propagation loss per distance function for the antennas. The distance values may be averaged or otherwise processed to determine the proximity.

At step 608, it is determined whether the proximity of the multimode wireless communication device 106 to the access point 102 is less than a threshold. The threshold may be based on any of several factors and may be dynamic or static. In the exemplary embodiment, the threshold is the maximum distance between the multimode wireless communication device 106 and the access point 102 where the access point 102 can provide WLAN service to the multimode wireless communication device 106. If the proximity is less than the threshold, the method continues at step 610. Otherwise, the method continues to step 612 where the procedure includes returning to step 402 of FIG. 4

At step 610, it is determined whether the multimode wireless communication device 106 should acquire WLAN service. Although the determination may be based solely on the proximity of the multimode wireless communication device 106 to the access point 102, other factors may be considered in some circumstances. Examples of other factors include the capacity of the access point 102, the required bandwidth required by the multimode wireless communication device 106, the current cost of the WWAN service and the estimated motion of the multimode wireless communication device 106. If the controller 204 determines that WLAN service should be acquired, the transmitter 310 in the access point 102 transmits the beacon signal 118 on the WWAN downlink to the multimode wireless communication device 106.

At step 612 the procedure includes returning to step 402 of FIG. 4. In some circumstances the acquisition may result in a handoff from the WWAN communication system 104 to the WLAN network 120. In other circumstances, service may be maintained from the WWAN communication system 104 or the multimode wireless communication device 106 may remain registered on the WWAN communication system 104 although no user data is transmitted over the WWAN communication channels. Accordingly, step 610 provides an exemplary technique of performing step 412 where the WWAN communication system 104 operates in accordance with IEEE 802.16(e) standards.

Figure 7:
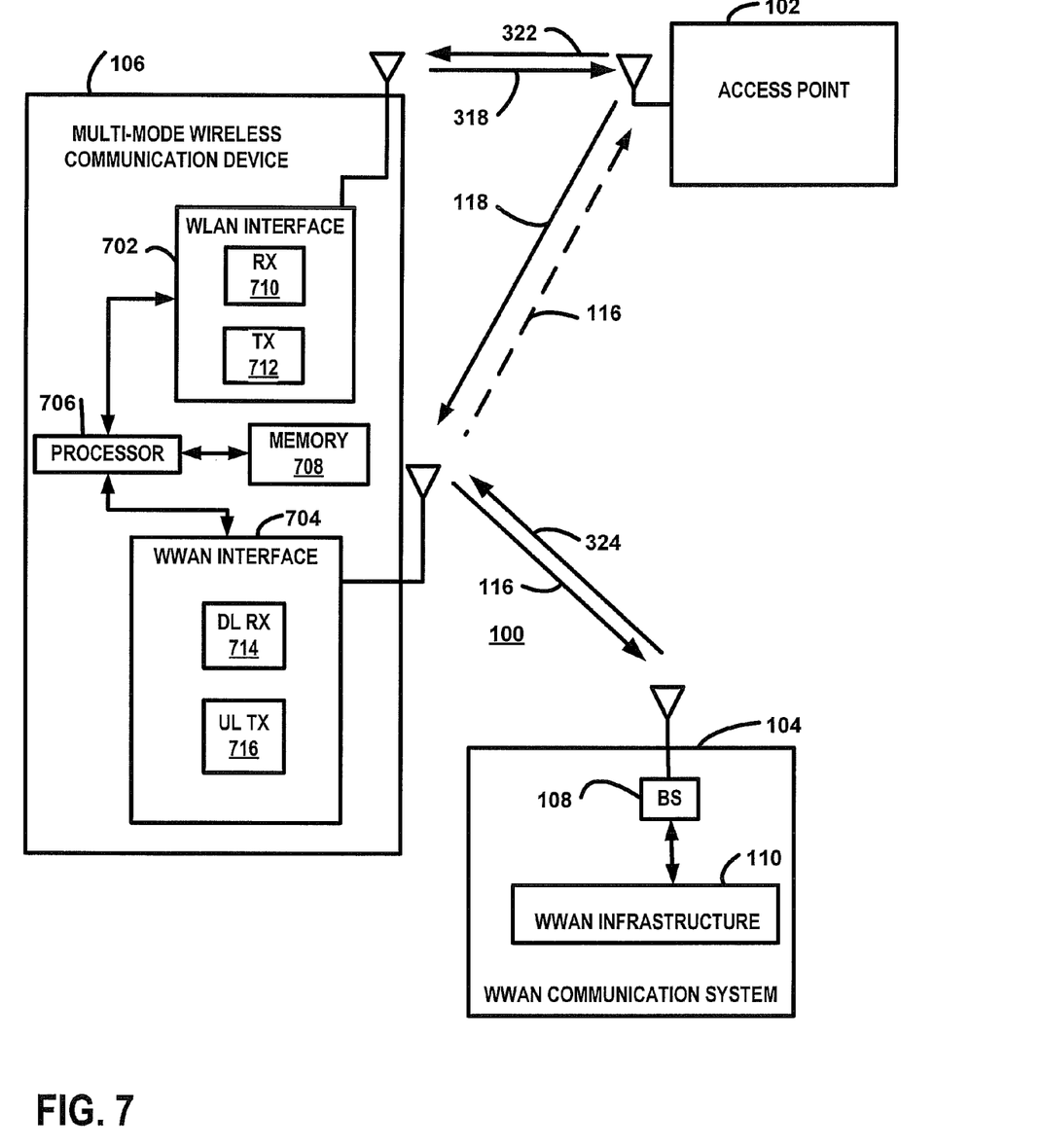
FIG. 7 is a block diagram of the communication network arrangement where the multimode wireless communications device receives a beacon signal from the access point on a WWAN downlink channel.

FIG. 7 is a block diagram of a multimode wireless communication device 106 within a communication network arrangement 100 in accordance with the exemplary embodiment of the invention. The multimode wireless communication device 106 comprises functionality implemented with any combination of hardware, software and firmware that is capable of communicating with at least one WLAN network 120, such as access point 102, and at least one WWAN communication network 120 104. The multimode wireless communication device 106, sometimes referred to as an access terminal, may be a wireless modem, a personal digital assistant, dual mode cellular telephone, or other such device. A suitable implementation of the multimode wireless communication device 106 includes a WLAN interface 702, and a WWAN interface 704 connected to a processor 706 and memory 708. The various functions and operations of the blocks described with reference to the multimode wireless communication device 106 may be implemented in any number of devices, circuits, or elements. Two or more of the functional blocks may be integrated in a single device and the functions described as performed in any single device may be implemented over several devices. For example, at least portions of the functions of the WLAN interface 702 and the WWAN interface 704 may be performed by the processor 706 and/or memory 708. The processor 706 performs the control functions described herein as well as performing other functions and facilitating the overall operation of the multimode wireless communications device 106. The processor 706 is connected to, or includes, the memory 708 that may include one or more random access memory (RAM) and/or read only memory (ROM) memory devices. The memory 708 may include data, as for example, a device identifier (ID) value, criteria for determining quality of the received signals, signal quality parameters and any other data. The WLAN interface 702 comprises a receiver 710 which is tuned to receive wireless communication signals over the WLAN frequency band air interface 322 from the WLAN access point 102, and the WLAN transmitter 712 which transmits wireless communication signals over the WLAN frequency band air interface 318 to the WLAN access point 102. The WWAN interface 704 comprises a downlink (DL) receiver 714 tuned to receive wireless communications signals in the WWAN downlink frequency band air interface from the WWAN communications system 104 and detect the beacon signal over the OFDM tone (sub-carrier) 118 from the WLAN access point 102. The WWAN interface 720 also includes the uplink (UL) transmitter 716 which sends uplink wireless communication signals 116 within the uplink frequency band.

During operation when the multimode wireless communication device 106 is not communicating with an access point, the DL receiver 714 monitors the WWAN downlink channel for a beacon signal 118 transmitted within the WWAN frequency band. A received beacon signal 118 is detected by the downlink receiver 714 and is decoded in the receiver 714 to extract the identifier (ID) which uniquely identifies the multimode wireless communication device 106 as the intended recipient of the beacon signal 118. The multimode wireless communication device 106 identifier (ID) value may include an electronic serial number (ESN) or other unique data. The ID value is stored in the memory 708 or some other suitable location, for the processor 706 to compare to the received ID. If the ID values match, the processor 706 activates the WLAN interface 702. In some circumstances, other criteria may be evaluated to determine if the WLAN interface should be activated. Examples of other criteria include a signal strength of the beacon signal 118, a SNR of the beacon signal, and communication requirements of the multimode wireless communication device. After detection of the beacon signal, the multimode wireless communication device 106 manages the WLAN connection. In accordance with known techniques, the multimode wireless communication device 106, establishes, maintains and disables communications between the multimode wireless communication device 106 and the WLAN. The WLAN connection may be simultaneously established and maintained with other communication links, such as communication links with the WWAN or may be established and maintained after communications have been disabled, lost, or otherwise made unavailable. Therefore, the WLAN communications may include a MAKE_BEFORE_BREAK connection that requires WLAN service to be established before WWAN communication is disabled in some circumstances. The WLAN connection may be managed by any combination of devices, algorithms, programs, equipment in the WWAN, WLAN and/multimode wireless communication device. The multimode wireless communication device 106 resumes monitoring the downlink link control channel for detection of the beacon signal 118.

In some circumstances, the multimode wireless communication device 106 includes a GPS receiver (not shown) that receives GPS data from GPS satellites. GPS information that is at least based on the GPS data is transmitted to the WWAN base station. The GPS information can be used by the WWAN and/or WLAN in managing the WLAN connection and or to determine whether the beacon signal should be transmitted. For example, if the geographical location indicated by the GPS information transmitted by a particular device indicates that the device is too far from the access point to receive WLAN service, the access point does not transmit the beacon signal. Also, if the GPS information transmitted by the device after the device detects the beacon signal indicates that the device is too far from the access point to receive WLAN service, a handoff to the acquisition of WLAN is not attempted. The GPS data may include GPS/AFLT data and the GPS information may include any combination of GPS data and/or geographical location information such the latitudinal and longitudinal coordinates. The GPS information may be intercepted by the access point or may be forwarded by the base station to the access point in some circumstances.

Figure 8:
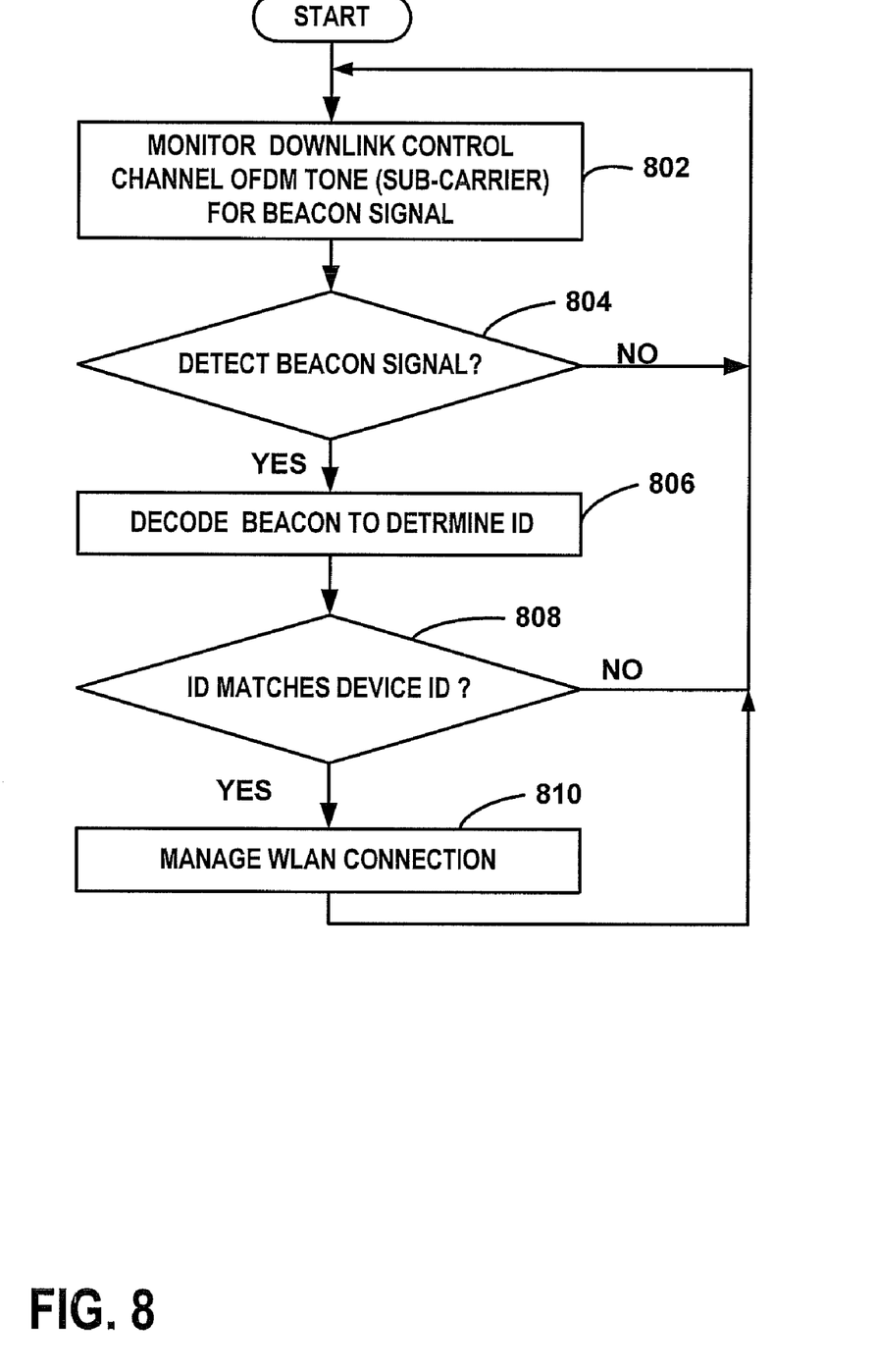
FIG. 8 is a flow chart of an exemplary method of managing a handoff using a beacon signal.

FIG. 8 is a flowchart of an exemplary method managing communications performed in the multimode wireless communication device 106. In the exemplary embodiment, code executed on the processor 706 performs the calculations, controls other devices and otherwise invokes the steps described below.

At step 802, the multimode wireless communication device 106 monitors the WWAN 104 downlink control channel with the receiver 714 tuned to the beacon 118 OFDM tone. The receiver is, at least periodically, tuned to appropriate frequency or frequencies where a beacon signal 108 may be present. Any received signals are evaluated at step 804.

At step 804, it is determined whether a beacon signal 118 has been detected. If a beacon signal 118 has been detected, the method continues at step 806. Otherwise, the method returns to step 802. Any of numerous techniques can be used to determine if a beacon signal 118 has been detected. Examples include detecting signal energy above a threshold, receiving and demodulating the signal and evaluating an energy or power level and/or determining a signal to noise ratio. In the exemplary embodiment, the received signal is demodulated and, if the signal is above an adequate threshold, the signal is decoded at step 806.

At step 806, the signal is decoded to determine a device identifier (ID). If the beacon signal 118 is detected at step 804, the multimode wireless communication device 106 further determines if the beacon 118 is intended for the multimode wireless communication device 106 by decoding the signal and extracting the device ID. In some circumstances if the device ID is not available other identifying information can be extracted from the beacon 118 signal to determine if the multimode wireless communication device 106 can access the access point 102 transmitting the beacon signal 118.

At step 808, it is determined whether the beacon signal 118 is being transmitted from the access point 102 that can be used for WLAN service by the multimode wireless communication device 106. The processor 706 compares the received device ID to the stored device ID value in the memory 708. If a match is found, the multimode wireless communication device 106 initiates a handoff procedure to acquire WLAN service from the access point 102. Otherwise the method returns to step 802. In some circumstances, other criteria may be evaluated to determine if WLAN communication should be attempted. For example, characteristics of the beacon signal such SNR and/or signal strength may be compared to thresholds to determine if the WLAN receiver should be activated. Also, communication requirements may be evaluated to determine if WLAN communication may be suitable. Further, in some situations, the determination to activate the WLAN receiver may be based on information received from the WWAN 104. The determination may be based on combinations of criteria and beacon signal 118 characteristics in some situations.

At step 810, the multimode wireless communication device 106 manages the WLAN connection. In accordance with known techniques, the multimode wireless communication device 106, establishes, maintains and disables communications between the multimode wireless communication device 106 and the WLAN. As described above, the WLAN connection may be simultaneously established and maintained with other communication links, such as communication links with the WWAN or may be established and maintained after communications have been disabled, lost, or otherwise made unavailable. Therefore, the WLAN communications may include a MAKE_BEFORE_BREAK connection that requires WLAN service to be established before WWAN communication is disabled in some circumstances. The WLAN connection may be managed by any combination of devices, algorithms, programs, equipment in the WWAN, WLAN and/multimode wireless communication device. The procedure returns to step 802 to continue monitoring the beacon channel.

In some circumstances, the multimode wireless communication device 106 manages the WLAN connection by transmitting GPS information to the WWAN base station where the based on GPS information is based on GPS data received by a GPS receiver in the multimode wireless communication device 106. The GPS information is used by WWAN and/or WLAN networks to determine if WLAN service should be acquired by the multimode wireless communication device 106. For example, the access point may receive the WWAN message including the GPS information that is being transmitted to the WWAN base station. The access point at least partially determines the proximity of the multimode wireless communication device based on the GPS information.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. An access point comprising:
a wireless local area network (WLAN) interface configured to exchange WLAN signals with a multimode wireless communication device;
a wireless wide area network (WWAN) receiver configured to receive a WWAN uplink signal transmitted from the multimode wireless communication device;
WWAN transmitter configured to transmit a beacon signal to the multimode wireless communication device within a WWAN frequency band when the WWAN uplink signal indicates that a distance between the multimode wireless communication device and the access point is less than a proximity threshold.

2. The access point of claim 1, wherein the WWAN transmitter is further configured to transmit the beacon signal on an orthogonal frequency division multiplexing (OFDM) tone.

3. The access point of claim 1, wherein the WWAN frequency band is a WWAN downlink frequency band used for transmission of downlink communication signals from a WWAN base station to the multimode wireless communication device.

4. The access point of claim 1, wherein a decision to handoff the multimode wireless communication device from the WWAN to the WLAN is at least partially based on a signal strength of the beacon signal when received at the multimode wireless communication device.

5. The access point of claim 1, further comprising a WWAN interface to receive downlink communication parameters from the WWAN.

6. The access point of claim 5 wherein the WWAN is configured to receive the downlink communication parameters through a wired connection.

7. The access point of claim 5 wherein the WWAN interface is configured to receive the downlink communication parameters through a wireless connection.

8. The access point of claim 7 wherein the WWAN interface comprises the WWAN receiver and is configured to receive the downlink communication parameters through a downlink WWAN control channel.

9. The access point of claim 1, wherein the WWAN transmitter is further configured to code the beacon signal in accordance with an identifier (ID) of the multimode wireless communication device.

10. The access point of claim 1, wherein the WWAN transmitter is further configured to code the beacon signal in accordance with a WLAN identifier (ID) of the access point.

11. A method performed at an access point configured to communicate with a multimode wireless communication device, the method comprising:

receiving a wireless wide area network (WWAN) downlink signal comprising uplink transmission control information;

receiving a WWAN uplink signal from the multimode wireless communication device;

determining a proximity of the multimode wireless communication device to the access point based on the uplink transmission control information and the WWAN uplink signal;

transmitting a beacon signal within a WWAN frequency band to the multimode wireless communication device when the proximity is less than a threshold; and exchanging wireless local area network (WLAN) signals with the multimode wireless communication device.

12. The method of claim 11, wherein the determining the proximity comprises calculating a power difference between a WWAN uplink signal transmission power level included in the UL transmission control information and a received power level of the WWAN uplink signal.

13. The method of claim 11, wherein the determining the proximity comprises calculating a time difference between a WWAN uplink signal transmission time included in the uplink transmission control information and a received time of the WWAN uplink signal.

14. The method of claim 11, wherein the determining the proximity comprises evaluating GPS information, transmitted by the multimode wireless communication device, indicating a geographical location of the multimode wireless communication device.

15. A system comprising:
an access point comprising:
a wireless local area network (WLAN) interface configured to exchange WLAN signals with a multimode wireless communication device;
a wireless wide area network (WWAN) receiver configured to receive a WWAN uplink signal transmitted from the multimode wireless communication device;
a WWAN transmitter configured to transmit a beacon signal within a WWAN frequency band when the WWAN uplink signal indicates that a distance between the multi mode wireless communication device and the access point is less than a proximity threshold; and
at least one multimode wireless communication device, operative to receive the beacon signal and to exchange WLAN signals with the access point.

16. The system of claim 15, wherein the at least one multimode wireless communication device comprises:
a wireless wide area network (WWAN) receiver to receive wireless communication signals within the WWAN downlink frequency band from a WWAN base station and to receive the beacon signal within the WWAN downlink frequency band from the access point;
a WLAN receiver to receive the WLAN signals from the access point; and
a processor to activate, in response to a determination that a characteristic of the beacons signal exceeds a threshold, the WLAN receiver to receive the WLAN signals.

17. The system of claim 15, wherein the at least one multimode wireless communication device is operative to receive the beacon signal on an orthogonal frequency division multiplexing (OFDM) tone.

18. The system of claim 16, wherein the at least one multimode wireless communication device WWAN receiver is configured to decode the beacon signal in accordance with an identifier (ID) of the multimode communication device.

19. The system of claim 16, wherein the characteristic is a signal to noise ratio (SNR) and the processor is configured to activate the at least one multimode wireless communication device WLAN receiver when the SNR is above an SNR threshold.

20. The system of claim 16, wherein the characteristic is a signal strength and the processor is configured to activate the at least one multimode wireless communication device WLAN receiver when the signal strength is above a signal strength threshold.

21. The system of claim 15, wherein the at least one multimode wireless communication device comprises:
a GPS receiver to receive GPS data; and
a WWAN transmitter to transmit GPS information based on the GPS data to a WWAN base station.

22. A multimode wireless communication device comprising:
a wireless wide area network (WWAN) receiver to receive wireless communication signals within a WWAN downlink frequency band from a WWAN base station and to receive a beacon signal within the WWAN downlink frequency band from an access point;
a WLAN receiver to receive WLAN signals from the access point; and
a processor to activate, in response to a determination that a characteristic of the beacons signal exceeds a threshold, the WLAN receiver to receive the WLAN signals.

23. The multimode wireless communication device of claim 22, wherein the beacon signal is received on an orthogonal frequency division multiplexing (OFDM) tone.

24. The multimode wireless communication device of claim 22, wherein the WWAN receiver is configured to decode the beacon signal in accordance with an identifier (ID) of the multimode communication device.

25. The multimode wireless communication device of claim 22, wherein the characteristic is a signal to noise ratio (SNR) and the processor is configured to activate the WLAN receiver when the SNR is above a SNR threshold.

26. The multimode wireless communication device of claim 22, wherein the characteristic is a signal strength and the processor is configured to activate the WLAN receiver when the signal strength is above a signal strength threshold.

27. The multimode wireless communication device of claim 22, further comprising:
a GPS receiver to receive GPS data; and
a WWAN transmitter to transmit GPS information based on the GPS data to the WWAN base station.

* * * * *